(12) United States Patent
Kalkanoglu

(10) Patent No.: US 8,206,539 B2
(45) Date of Patent: Jun. 26, 2012

(54) PANEL OF ROOFING SHINGLES

(75) Inventor: Husnu Kalkanoglu, Swarthmore, PA (US)

(73) Assignee: Certainteed Corporation, Valley Forge, PA (US)

(*) Notice: Subject to any disclaimer, the term of this patent is extended or adjusted under 35 U.S.C. 154(b) by 34 days.

(21) Appl. No.: 12/720,163

(22) Filed: Mar. 9, 2010

(65) Prior Publication Data

US 2010/0154973 A1    Jun. 24, 2010

Related U.S. Application Data

(62) Division of application No. 11/671,136, filed on Feb. 5, 2007, now Pat. No. 7,726,086.

(51) Int. Cl.
B29C 47/02 (2006.01)
B29C 39/04 (2006.01)
E04D 1/26 (2006.01)

(52) U.S. Cl. ............ 156/245; 156/244.11; 156/244.25; 264/46.8; 264/172.19; 425/115; 425/335; 52/309.9; 52/555; 52/558

(58) Field of Classification Search ............. 264/172.19, 264/46.1, 46.2, 46.3, 46.4, 46.5, 46.8; 100/151; 52/555, 558, 309.9, 309.11; 425/115
See application file for complete search history.

(56) References Cited

U.S. PATENT DOCUMENTS

| | | | |
|---|---|---|---|
| 2,983,962 A * | 5/1961 | Merz et al. | 264/45.4 |
| 3,605,369 A | 9/1971 | Merrill et al. | |
| 3,774,428 A | 11/1973 | Derry et al. | |
| 3,830,687 A | 8/1974 | Re et al. | |
| 3,852,934 A | 12/1974 | Kirkhuff | |
| 3,868,300 A | 2/1975 | Wheeler | |
| 3,887,410 A | 6/1975 | Lindner | |
| 3,895,087 A | 7/1975 | Ottinger et al. | |
| 3,897,667 A * | 8/1975 | Turek | 52/546 |
| 3,936,518 A | 2/1976 | Soda et al. | |
| 4,034,528 A | 7/1977 | Sanders et al. | |
| 4,065,899 A | 1/1978 | Kirkhuff | |
| 4,141,944 A | 2/1979 | Anstadt et al. | |
| 4,191,722 A | 3/1980 | Gould | |
| 4,279,106 A | 7/1981 | Gleason et al. | |
| 4,290,248 A * | 9/1981 | Kemerer et al. | 52/309.16 |
| 4,356,216 A | 10/1982 | Gailey et al. | |

(Continued)

FOREIGN PATENT DOCUMENTS

JP    62174136 A    *  7/1987

(Continued)

OTHER PUBLICATIONS

CertainTeed, CedarBoards™, trade literature, Nov. 2005, 14 pages.

(Continued)

*Primary Examiner* — Philip Tucker
*Assistant Examiner* — William Bell
(74) *Attorney, Agent, or Firm* — Duane Morris LLP

(57) ABSTRACT

A roofing panel, a roof, an array of roofing panels, and a method of manufacturing a roofing panel by transporting a capstock layer of the roofing panel through a moving belt mold, and forming a polymeric material in situ against the outer layer while in a mold cavity of the moving belt mold. The capstock layer is vacuum formed to shape and form a plurality of roofing shingles and to impress the shingles with surface topography features simulating natural materials.

8 Claims, 7 Drawing Sheets

U.S. PATENT DOCUMENTS

| | | | |
|---|---|---|---|
| 4,356,217 A | 10/1982 | Wollam et al. | |
| 4,366,197 A | 12/1982 | Hanlon et al. | |
| 4,411,215 A | 10/1983 | Gailey et al. | |
| 4,411,218 A | 10/1983 | Wollam et al. | |
| 4,468,909 A | 9/1984 | Eaton | |
| 4,680,911 A | 7/1987 | Davis et al. | |
| 5,017,320 A | 5/1991 | Velazquez Garcia | |
| 5,053,176 A | 10/1991 | Cameron et al. | |
| 5,126,088 A | 6/1992 | Andres | |
| 5,167,781 A | 12/1992 | Kemerer et al. | |
| 5,232,751 A | 8/1993 | Cameron et al. | |
| 5,244,618 A | 9/1993 | Kemerer et al. | |
| 5,259,872 A | 11/1993 | Shinozaki et al. | |
| 5,305,569 A | 4/1994 | Malmquist et al. | |
| 5,314,325 A | 5/1994 | Bosler | |
| 5,330,341 A | 7/1994 | Kemerer et al. | |
| 5,332,602 A | 7/1994 | Barre et al. | |
| 5,387,381 A | 2/1995 | Saloom | |
| 5,458,477 A | 10/1995 | Kemerer et al. | |
| 5,502,940 A | 4/1996 | Fifield | |
| 5,505,599 A * | 4/1996 | Kemerer et al. | 425/4 C |
| 5,553,427 A | 9/1996 | Andres | |
| 5,695,373 A | 12/1997 | Blackmore et al. | |
| 5,700,495 A | 12/1997 | Kemerer et al. | |
| 5,866,054 A | 2/1999 | Dorchester et al. | |
| 5,866,639 A | 2/1999 | Dorchester et al. | |
| 5,869,176 A | 2/1999 | Dorchester et al. | |
| 5,881,508 A | 3/1999 | Irvine et al. | |
| 5,906,840 A | 5/1999 | Bosler et al. | |
| 5,998,006 A | 12/1999 | Bambara et al. | |
| 6,295,777 B1 | 10/2001 | Hunter et al. | |
| 6,319,456 B1 | 11/2001 | Gilbert et al. | |
| 6,641,384 B2 | 11/2003 | Bosler et al. | |
| 6,737,008 B2 * | 5/2004 | Gilbert et al. | 264/553 |
| 6,752,941 B2 | 6/2004 | Hills | |
| 6,823,794 B2 | 11/2004 | Bosler et al. | |
| 2003/0080475 A1* | 5/2003 | Bosler et al. | 264/571 |
| 2004/0075188 A1 | 4/2004 | Kemerer | |
| 2004/0089978 A1 | 5/2004 | Zimmerman et al. | |
| 2005/0003221 A1 | 1/2005 | Walrath | |
| 2005/0053767 A1 | 3/2005 | Franco et al. | |
| 2005/0116373 A1 | 6/2005 | Evans et al. | |
| 2005/0127345 A1 | 6/2005 | Giacchino | |
| 2006/0029775 A1 | 2/2006 | MacKinnon et al. | |
| 2006/0053715 A1 | 3/2006 | Mowery | |
| 2006/0053716 A1 | 3/2006 | Mowery | |
| 2006/0078720 A1 | 4/2006 | Toas et al. | |
| 2010/0107550 A1 | 5/2010 | Toas et al. | |

FOREIGN PATENT DOCUMENTS

| | | |
|---|---|---|
| JP | 05169520 A * | 7/1993 |
| WO | WO97/04019 | 2/1997 |
| WO | WO98/52996 | 11/1998 |
| WO | WO03/037596 | 5/2003 |

OTHER PUBLICATIONS

CertainTeed, Product Comparison, trade literature, Jan. 24, 2006, 3 pages.

Hunter, R., The Measurement of Appearance, 1975, pp. 54-57; 65-80; 218-233, John Wiley & Sons, Inc.

* cited by examiner

PANEL OF ROOFING SHINGLES

CROSS REFERENCE TO RELATED APPLICATION

The present application is a Divisional application of U.S. Ser. No. 11/671,136, filed Feb. 5, 2007, now U.S. Pat. No. 7,726,086.

FIELD OF THE INVENTION

The invention relates to a panel of roofing shingles made from resinous polymeric materials that simulate the appearance of shingles made from natural materials.

BACKGROUND

US 2006/0029775 A1 discloses a single roofing shingle made by coextruding a capstock layer with a filler material, and then cutting the same into one or more individual shingles. U.S. Pat. No. 3,897,667 discloses casting a foam onto a sheet formed into a panel of shingles in a closed mold wherein closing and opening the mold is performed in a step and repeat process.

It would be advantageous to manufacture a plurality of roofing shingles continuously joined together to form a panel, which is faster to manufacture than a step and repeat process. Further it would be advantageous to manufacture the panel of roofing shingles with a polymeric foam layer which lightens the weight thereof for ease in handling, while having substantial stiffness and beam thickness to resist beam deflection. Further, it would be advantageous for the foam thickness to provide thermal insulation.

U.S. Pat. No. 5,167,781 discloses a foamed plastic material injected into a mold cavity while at an early stage of its foaming action. Foaming is completed in the mold to control finished product density. A separate assembly operation is required to join the foamed plastic material with an outer layer to form a panel. It would be advantageous to eliminate the separate assembly operation by an apparatus capable of bonding the foamed plastic layer with the outer layer while the inner layer is foamed and molded to a desired shape.

U.S. Pat. No. 6,641,384 discloses a belt mold apparatus for continuously molding a polymeric material between a pair of continuous belts, each of which continuously rotates in a loop that circumscribes spaced apart rollers. The pair of belts continuously rotate into positions adjacent each other to form a moving mold between the belts. The polymeric material in a melt state is introduced into a front end of the moving mold. The moving mold shapes the polymeric material therein to form a continuous manufactured article. The moving mold travels from front to rear, accompanying the moving belts. While the belts move rearward and then rotate away from each other, the mold opens, which releases the continuous manufactured article, such that the article withdraws from the moving mold in a rearward direction. The mold includes a vacuum manifold that draws a vacuum on the polymeric material in the mold interior, such that air in the mold interior is evacuated and the polymeric material fills the mold interior and is shaped by a vacuum molding process. Each belt is supported against a flat support belt having apertures through which the vacuum is drawn, such that the vacuum draws the belt against the support belt. A suitable support belt and vacuum manifold are disclosed in U.S. Pat. No. 5,906,840.

Each of U.S. Pat. Nos. 6,319,456 and 6,737,008 discloses a two-layer polymeric building product of continuous length that is formed with visibly aesthetic surface features on a surface of the two-layer building product by using a moving mold formed between a pair of moving belts. The belts loop around rotating rollers and travel continuously in respective loops to continuously rotate into position beside each other and form the moving mold therebetween. The building product is continuously molded lengthwise with lateral edge portions extending continuously lengthwise. Subsequent to completion of the mold, such lateral edge portions are plastically deformed while still hot, by using a mechanical means to shape a butt edge and a nailing edge, respectively. Further, a punch press is used to mechanically punch a series of apertures laterally through the nailing edge of the building product. Insulation is disclosed as being applied by spraying a foamed polyurethane emulsion.

SUMMARY OF THE INVENTION

A panel of roofing shingles comprises a capstock layer bonded with a foamed polymeric material forming a base layer, wherein the capstock layer is formed into a plurality of roofing shingles, and the shingles are formed with surface topography features simulating those appearing in shingles of natural materials.

According to a method of the invention, a continuous length pattern of roofing shingles is molded into a lengthwise surface of a unitary capstock layer, and a continuous base layer is foamed in situ on the unitary capstock layer such that the pattern of roofing shingles have the thickness and appearance of individual roofing shingles of natural materials.

The panel of roofing shingles is manufactured by a method of vacuum forming a capstock layer of polymeric material to comprise a plurality of roofing shingles and impressing the shingles with surface topography features simulating natural materials, and injecting a polymeric material into a mold cavity of a moving belt mold and foaming the polymeric material while in the mold cavity in situ against the capstock layer, and bonding together and solidifying the capstock layer and the foam polymeric material in the belt mold to comprise the panel.

Apparatus to manufacture a panel of roofing shingles comprises, a lower belt mold shaping and forming a capstock layer with a plurality of roofing shingles having butt edges and surface topography features simulating the appearance of natural materials; and an upper belt mold defining a mold cavity in which a polymeric material is foamed in situ on the capstock layer to provide a foam base layer.

According to an embodiment of the invention, the capstock layer is formed by extrusion and is fed into the moving belt mold.

According to another embodiment of the invention, the plurality of roofing shingles are joined together along recessed edges formed in the capstock layer and simulating abutting edges of individual shingles made of natural materials.

Other embodiments and advantages of the invention will be apparent by way of example with reference to the accompanying drawings.

DETAILED DESCRIPTION

Figure 1:
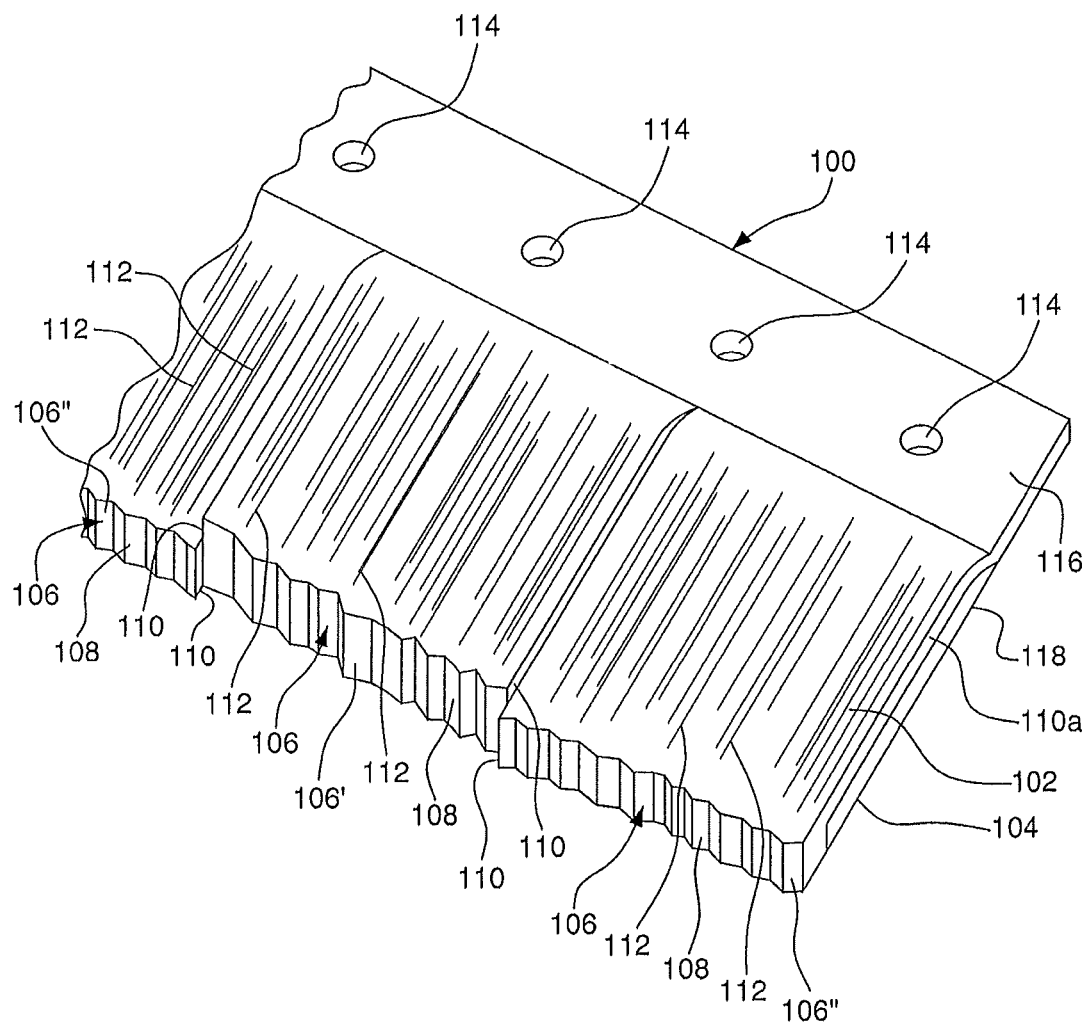
FIG. 1 is an isometric view of an embodiment of a roofing panel.

As disclosed by FIG. 1, an embodiment of a panel 100, a roofing panel, comprises a unitary capstock layer 102 of polymeric material covering and bonded to a shaped, foamed polymeric material forming a unitary foam base layer 104. A continuous length pattern of side-by-side roofing shingles 106 is molded into a lengthwise surface of the unitary capstock layer 102, and a continuous base layer 104 is foamed in situ on the unitary capstock layer 102 such that the pattern of roofing shingles 106 have the thickness and appearance of individual roofing shingles of natural materials. The continuous capstock layer 102 is shaped and formed by vacuum molding into the shape of a plurality of individual roofing shingles 106 side-by-side. The capstock layer 102 is shaped and formed to have butt edges 108 manufactured on respective shingles 106, thereby simulating the butt edges formed on shingles of natural materials, such as, split cedar wood shakes, slate tile, quarry tile, glazed or unglazed ceramic tile, or such other shingles of natural materials found in nature that lend a desired natural appearance to a roof on a building.

The butt edges 108 on the shingles 106 are misaligned with one another side-to side in an embodiment of the invention to simulate randomly arranged shingles of different lengths to correspond with the appearance of cedar shakes or slate tiles. The side edges 110 of the shingles 106 are shaped and formed by vacuum molding to simulate abutting side-by-side edges of individual shingles of natural materials. The side edges 110 comprise unitary selvage edges on the side-by-side shingles 106. Thereby the unitary selvage edges join the shingles 106 such that the shingles 106 are free of open seams that would leak or trap moisture between the shingles 106. Further the side edges 110 are molded at different heights in an embodiment of the invention to simulate randomly arranged shingles of slightly different thicknesses. Thus, a continuous capstock layer 102 is readily formed into various side-by-side shingles 106 differing slightly in appearance from each other to simulate shingles made from natural materials. In FIG. 1, a shingle 106' that is thicker by comparison to a thinner shingle 106", is slightly shorter in length to the butt edge 108 by comparison to the length of the thinner shingle 106" to is butt edge 108. Whether the shingles 106 are thicker or thinner, or longer or shorter, each is formed with substantially the same volume of polymeric material comprising the capstock layer 106. Thereby differently shaped portions of a mold cavity are assured to receive and fill with adequate polymeric material without voids in the polymeric material caused by inadequate filling of the mold cavity. According to another embodiment of the invention, an exemplary shingle 106' has a butt edge 108 comprising a beveled edge that is beveled relative to the substantially flat bottom of the foam base layer 104. The shingle 106' that has a beveled butt edge 108 is adjacent to at least one of the shingles 106" having butt edges 108 that are not beveled. Advantageously, the shingles 106' and 106" are formed by the mold to comprise the same lengths with their respective butt edges 108 side by side. The beveled butt edge 108 give the appearance that individual shingle 106' has a different length than an adjacent shingle 106" even though all the shingles 106' and 106" comprise substantially the same lengths. The cedar shake pattern formed by the mold comprises one or more exemplary shingles 106' having respective beveled butt edges 108. Each beveled butt edge 108 provides a topography of the panel 100 having aesthetically pleasing shadow effects when illuminated, which compares similarly to a jagged appearance of shingle shakes of natural materials having different lengths.

Each of the shingles 106 have surface topography features 112 impressed by vacuum molding to simulate the appearance of shingles of natural materials. A process of molding produces each of the surface topography features 112 capable of being irregular in recessed depth, in projecting height and in area pattern, to appear as randomly shaped or irregular surface topography features, as found in a natural material, compared to a process of extrusion that produces features having straight length dimensions and constant cross sectional dimensions, such as, a straight groove or a straight raised rib. The surface topography features 112 comprise surface peaks and valleys of varied area patterns that simulate those of a natural material, including but not limited to, split cedar wood, slate tile, quarry tile and glazed or unglazed ceramic tile. For example, split cedar wood will have irregular wood grain combined with split-formed surfaces. Slate will have a rough granular surface and irregular patterns of color shades and intensity. Quarry tile and unglazed ceramic tile will have a rough granular surface of low gloss and an even clay color distribution. Glazed tile will have a high temperature fired coating that forms a smooth coating or glaze usually with a high gloss or a matte finish gloss. Quarry tile and ceramic tile are available as a flat plate or a half-round shape. The corresponding surface topography features on the butt edges 108 of the shingles are fabricated to have the appearance of being rough cut, split, quarried, or formed ceramic, to simulate the appearance of shingles of natural materials. The panel 100 of roofing shingles 106 is cut to length by cutting transversely along a cut edge 110a, preferably adjacent to a side edge 110 of a corresponding shingle 106, such that a whole shingle 106 is adjacent to the cut edge 110a.

Each of the shingles 106 is unitary with a nailing edge 116 of the panel 100, and depend laterally from a lengthwise edge of the nailing edge 116. Apertures or recesses 114 extend laterally into the cross section of the nailing edge 116 of the panel 100 for receiving fasteners, such as, nails or screws, not shown, for installing the shingles 106 to make a roof.

An array of one or more roofing panels 100 are assembled in courses that overlap to provide a roof. Each roofing panel 100 in a first of the courses has the nailing edge 116 to secure the panel 100 in place, for example, by nailing the nailing edge 116, to standard roof materials, such as, roof sheathing forming a roof surface or stringers that comprise nailing strips that bridge across roof rafters, roof underlayment usually over roof sheathing, or existing bituminous shingles in need of repair or replacement. Each of further roofing panels 100 one or more thereof in a second of the courses comprises a butt edge 108 overlapping and covering a nailing edge 116 of a corresponding one or more of the roofing panels 100 in the first of the courses. A roof comprises the array of roofing panels 100.

Further, the base layer 104 has a flat planar interior surface 118 to form an underside of a roof. In an embodiment of the roofing panel 100 disclosed by FIG. 1, the foam base layer 104 has a thickness that qualifies as an R-value thickness, when an R-value rated insulation is desired. The polymeric materials of the panel 100 comprises a mixed combination of resinous polymeric materials and additives prior to being extruded. A preferred embodiment contains a flame retardant material additive to avert the danger of spontaneous combustion, especially when the roofing panels 100 are installed directly over bituminous shingles of an existing roof.

The capstock layer 102 comprises either a single layer of polymeric material, or comprises a multilayer form having two or more polymeric layers, each of which is extruded one over the other, either by coextrusion in a single extruder, or by separate extrusion in a number of successive extruders. The one or more layers comprising the capstock layer 102 are unfoamed and are preferably nonporous and selected to provide a visually aesthetic, finished surface and which comprise polymer compatible additives imparting chemical and mechanical properties required of a roofing panel, for example, water and moisture resistance, flame resistance, ultraviolet resistance, surface texture or finish, colorfast, toughness, wear resistance, impact resistance and stain resistance. In an embodiment of the invention, a top layer of a multilayer form of the capstock layer 102 comprises a translucent or transparent top layer.

The capstock layer 102 covers the base layer 104 that comprises a polymeric foam base layer 104 which is foamed in situ on the capstock layer 102. The foam structure is lightweight for ease in handling. The foam structure has a substantial stiffness and beam thickness to resist force deflection. The foam structure provides a bulk thickness that imitates the thickness of shingles made of natural materials. The foam structure and bulk thickness thereof provides thermal insulation to reduce solar heating. Preferably, the foam comprises a closed cell foam to minimize water collection. Alternatively, the foam comprises an open cell foam that is water repellant and/or the open cell structure is sufficiently small to resist capillary wetting.

An embodiment of the foamed base layer 104 provides a flat surface for flush mounting against a flat surface of a building or to mount directly on underlayment or directly on bituminous shingles in need of repair or replacement.

Each of U.S. Pat. Nos. 6,319,456 and 6,737,008 discloses a foam lining made by spraying a foamed polyurethane emulsion onto the back of a polyvinylchloride, PVC, simulated cedar shake panel. By contrast, according to an embodiment of the invention the base layer 104 is continuously molded in situ with the capstock layer 102 to foam, shape and melt bond directly to the capstock layer 102. A process of spraying a foam lining is unable to form the fastener receiving apertures 114 through the panel 100, and would fill such apertures that are formed prior to spraying. Further, the process of spraying a foam lining lacks the precision dimensions of a molded foam. According to the invention, the foam base layer 104 is continuously molded in situ to a desired thickness and shape, as will be described.

Further, according to an embodiment of the invention, the capstock layer 102 comprises a polymeric material capable of forming a melt bond with the polymeric material of the inner layer 104. A melt bond is formed at the interface of two, chemically compatible materials, wherein one of the materials comprises a polar ionized composition with a melt phase surface, and the other of the materials in solid phase has a surface, alternatively a partially melted surface, with the capability to form covalent melt bonds with the melt phase surface of the polar ionized composition. The melt phase surface is then solidified to a solid phase to form a solidified melt bond that affixes or retains the two chemically compatible materials.

A melt bond is formed in an alternative manner at the interface of two, chemically compatible materials, for example, when one of the materials has a melt phase surface, and the surface of the second material in solid phase is of low phobicity to the adherent macromolecular morphology formed by the melt phase surface. Alternatively, a partially melted surface is formed on the second material in solid phase, and is of similar low phobicity. The melt phase is then solidified to a solid phase, by complete polymerization, solvent drying or cooling, as appropriate according to the chemical composition being solidified from the melt phase, to form a solidified melt bond between the two materials. The capstock layer 102 and the base layer 104 melt bond when, for example, they comprise the same chemical family. Additionally, a melt bond is formed when the capstock layer 102 comprises a copolymer having in part a polymer of the same chemical family as the polymer of the base layer 104, or when the capstock layer 102 has a higher molecular weight that that of the base layer 104, such that, the copolymer or higher molecular weight polymer of the capstock layer 102 has a higher melt temperature than the polymer of the inner layer 104. Accordingly a melt bond forms at a melt temperature below the melt temperature of the capstock layer 102. For example, a copolymer of vinyl chloride or a high molecular weight polyvinyl chloride of the capstock layer 102 has a higher melt temperature than a lower molecular weight polyvinyl chloride of the foamed inner layer 104. Other combinations of chemically compatible, melt bonded, polymer compositions include, but are not limited to, polyurethane thermoplastic melt bonding with either polyester, polypropylene, polyethylene, polyvinyl chloride or polystyrene, polyester melt bonding with either polypropylene, polyethylene, polyvinyl chloride or polystyrene, unsaturated polyethylene melt bonding with saturated polyethylene. Additionally a melt bond is formed when the capstock layer 102 and base layer 104 are of complementary acid-base character, thus resulting in a melt bond enhanced by acid-base interactions, also known as specific interactions, in the inter-face region. Such specific interactions result when the capstock layer 102 is acidic in nature and the base layer 104 is basic in nature. Alternatively such specific interactions result when the capstock layer 102 is basic in nature and the base layer 104 is acidic in nature.

The liquid phase referred to herein comprises; a fluent polymeric composition at a temperature above its melt temperature, or fluent thermoset composition in a prepolymerized liquid phase at a temperature above its melt temperature. The melt phase includes, but is not limited to, a prepolymerized liquid phase, a heat induced liquid phase or a chemically induced liquid phase. A prepolymerized melt phase refers to a thermoset resin composition, or a polymeric resin composition dissolved in a compatible solvent, prior to complete polymerization of the composition. A heat induced liquid phase refers to a polymeric composition in solid phase to which heat is applied to heat the surface of the composition at least to its melt temperature to provide a liquid phase surface.

According to an embodiment of the invention, the foamed base layer 104 comprises a polymeric material including, but not limited to, a resinous polymer composition of ethylene, vinyl, styrene, olefin, carbonate, sulphone, acetal, ester, amide, acryl and polymers thereof, for example, polyisocyanurate, polyvinyl chloride (PVC), polystyrene, polycarbonate, polypropylene, and acrylic-containing resins, such as, AES, ASA and acrylonitrile butadiene styrene (ABS). Further, the material of the base layer 104 is entrained with a foaming agent or foamant, gas filled pellets, polymer microbubbles or chemical or physical blowing agents to foam the base layer 104 when the same is heated and shaped. The resinous polymer composition provides a matrix for filler materials, such as, glass fibers, polymer fibers, colorants, diluents and ultraviolet stabilizers.

Figure 2:
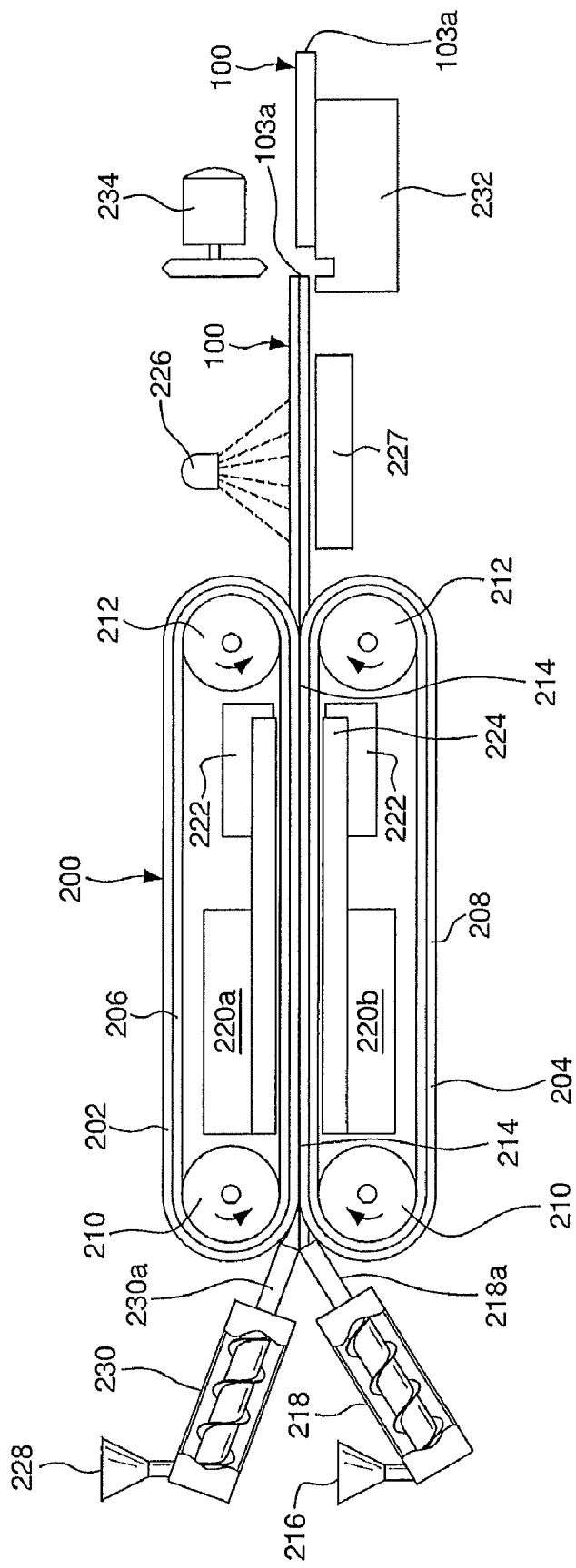
FIG. 2 is a schematic view in elevation disclosing a molding apparatus.

FIG. 2 discloses an apparatus 200 comprising a belt mold for molding the foam layer 104 in situ on the capstock 102. Opposite halves 202, 204 of the belt mold 200 comprise respective moving belts 206, 208. Each of the belts 206, 208 continuously rotates in a loop that engages the circumferences of a front roller 210 and a rear roller 212. The pair of belts 206, 208 move in synchronization such that they rotate into positions adjacent each other to close together the mold halves 202, 204 of the moving belt mold 200. Further, the mold halves 202, 204 meet each other at an input end of the apparatus 200, and continue to move while closed together along a mold parting line 214 of the moving belt mold 200. At an output end of the apparatus 200 the mold halves 202, 204 separate from each other along the mold parting line 214.

FIG. 2 discloses a hopper 216 into which materials for making the capstock layer 102 are supplied as pellets, particulates or liquid form, respectively. The hopper 216 feeds the materials into a heated screw feed 218 of the type for a hot melt extruder. The materials are melted and mixed to provide a composite polymeric material in a melt state that is advanced by the screw feed 218 through the mouth of an extrusion die 218a to shape and form a continuous capstock layer 102. Preferably, the extrusion die 218a produces a preliminary or precursor form of the butt edge 108 and nailing edge 116 on the capstock layer 102. According to an embodiment of the invention, the capstock layer 102 is extruded by the extrusion die 218a as a layer having a cross section of constant thickness throughout. According to another embodiment, the capstock layer 102 is extruded with a cross section of varied thickness, wherein a thicker cross section is provided where needed to fill the mold cavity that has a greater volume to be filled with the capstock layer 102. According to another embodiment, the extruded capstock layer has an L-shaped cross section in which the long side of the L-shaped cross section forms the precursor of the shingles 106 and the short side of the L-shaped cross section forms a precursor of the butt edges 108 of the shingles 106. FIG. 2 discloses the extrusion die 218a in the same manufacturing line with the belt mold 200, such that the capstock layer 102 emerges from the extrusion die 218a without substantial cooling before being immediately introduced into the belt mold 200. According to an alternative embodiment of the invention, the capstock layer 102 having a preliminary or precursor form of the butt edge 108 and nailing edge 116 is produced by the extrusion die 218 in another manufacturing apparatus 800, FIG. 8, separate from the same manufacturing line with the belt mold 200, such that its temperature can recede to atmospheric temperature before being introduced into the belt mold 200. Further, the capstock layer 102 from the other manufacturing apparatus 800 is cut to a desired length, such that the cut edge 110a is on the capstock layer 102 before the same is introduced into the moving belt mold 200. According to yet another alternative embodiment of the invention, the capstock layer 102 is produced by extrusion die 218 as a continuous sheet to form a coil stock. The coil stock is then subsequently reheated for example by passing over a hot can or other heat source and then introduced into the belt mold 200 as a reheated continuous capstock layer.

The capstock layer 102 is introduced into a front end of the moving belt mold 200. The capstock layer 102 is transported within the belt mold 200, while the belt mold 200 shapes and forms the capstock layer 102 with the shingles 106, the butt edges 108, the surface topography features 112 and the nailing edge 116 having the apertures or recesses 114. The capstock layer 102 is transported by the moving belts 206, 208 continuously in and through the belt mold 200 as the belt mold 200 moves from front to rear. In a further embodiment, apertures 114 are provided by a punching operation, or as a separate operation, either before or after cutting the continuous product into individual panels.

FIG. 2 discloses another hopper 228 into which materials for making the inner layer 104 of the roofing panel 100 are supplied as pellets, particulates or liquid form, respectively. The hopper 228 feeds the materials into a heated screw feed 230 of the type for a hot melt extruder. The materials are mixed and melted to provide the polymeric material in a melt state that is introduced continuously into a front end of the moving belt mold 200. The materials are melted and mixed to provide a composite polymeric material in a melt state that is advanced by the screw feed 230 through the mouth of an extrusion die 230a to shape and form a broad, continuous base layer 104, as broad as required to fill the interior width of the belt mold 200 with the polymeric material. For example, the moving belt mold 200 shapes the polymeric material in situ against the continuous capstock layer 102 to form the roofing panel 100. The roofing panel 100 then withdraws from a rear of the moving belt mold 200 while having the polymeric material of the continuous base layer 104 formed in situ against the continuous capstock layer 102.

The apparatus 200 includes one or more heat supplying, upper and lower ovens 220a, 220b distributed along respective mold halves 202, 204 and along the length and width of the belt mold 200. The lower oven 220b maintains the capstock layer 102 at least at its heat deflection temperature to allow the capstock layer 102 to be shaped and formed by the lower mold half 204 into the individual shingles 106 having the butt edges 108, the side edges 110 and the surface topography features 112. Alternatively, the capstock layer 102 while at least at its glass transition temperature, melt temperature or heat deflection temperature, is shaped and formed by the lower mold half 204. The capstock layer 102 at its heat deflection temperature is a malleable solid that can be shaped and formed and impressed with surface features. When cooled below its heat deflection temperature the capstock layer 102 becomes rigid to maintain its form and shape and to maintain its impressed surface features.

The upper oven 220a heats the base layer 104 at least to the temperature at which foaming of the polymeric materials is completed to fill the upper mold half 202, and to the temperature at which the polymeric materials cure to solidify the foamed structure thereof to a stable form and shape.

Upper and lower cooling manifolds 222 provide cooling air or other cooling medium to cool the capstock layer 102 and the base layer 104 below their respective heat deflection temperatures to solidify the shapes and surface topography thereof, while in a rear portion of the belt mold 200, and prior to opening of the belt mold 200. An optional cooling device comprises a sprayer 226 and collector 227 near and after the rear end of the belt mold 200 for water spraying and cooling the product leaving the belt mold 200.

Figure 3:
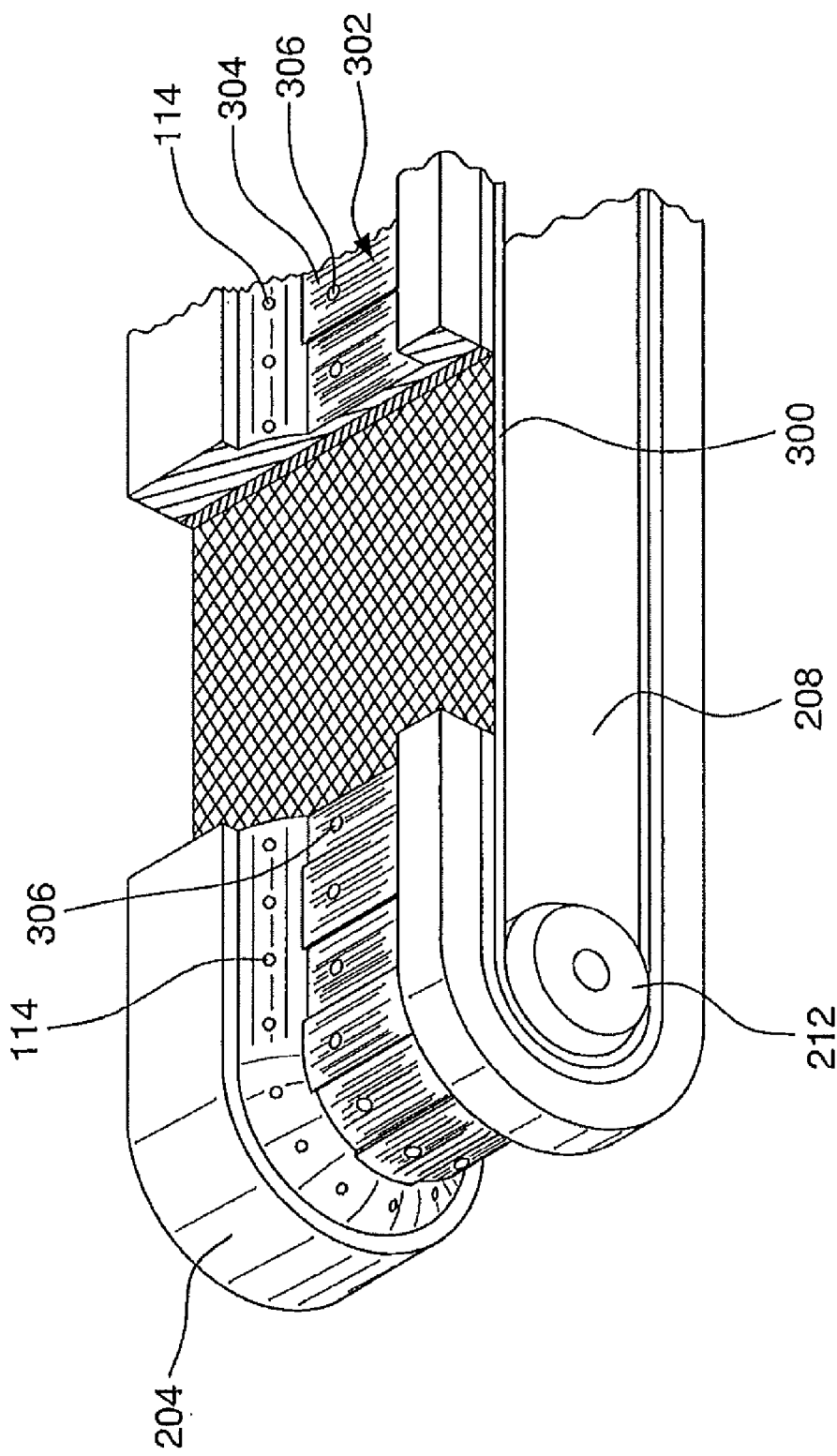
FIG. 3 is a schematic view of a portion of the apparatus disclosed by FIG. 2.
Figure 4:
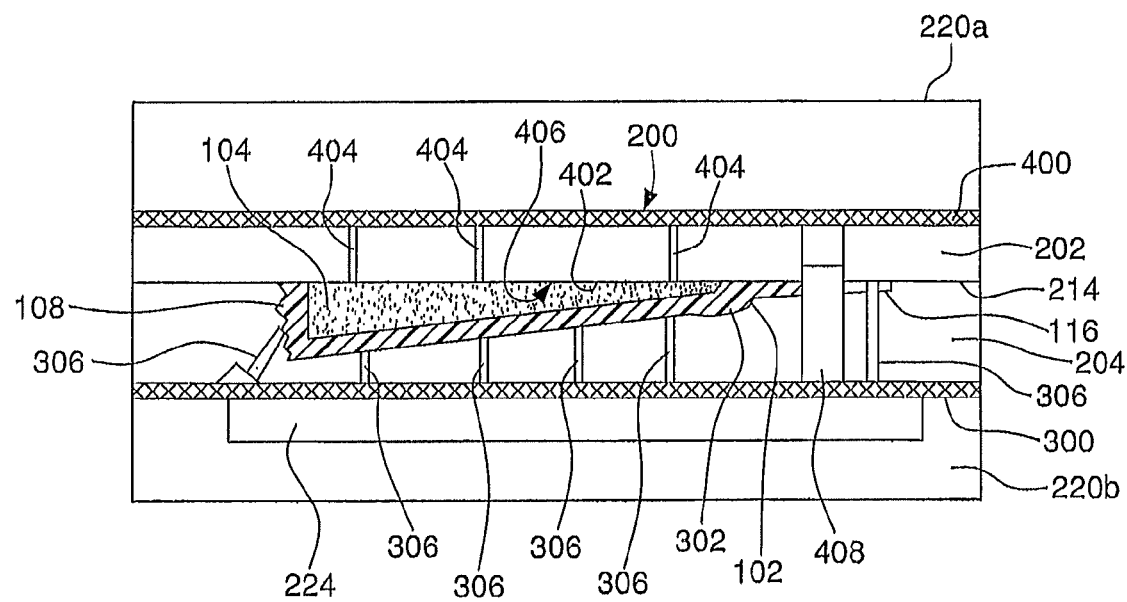
FIG. 4 is a cross section view of a portion of the apparatus disclosed by FIG. 2.

FIG. 2. discloses the mold halves 202, 204 that close together to form a mold, and continue to move past and move over stationary, one or more vacuum manifolds 224 that draw a reduced air pressure on the lower mold half 202 while the mold halves 202, 204 close on both the capstock layer 102 and the base layer 104. FIGS. 3 and 4 disclose embodiments of the mold halves 202, 204 in further detail.

Each of FIGS. 3 and 4 discloses the apparatus 200 having the lower mold half 204 on a corresponding lower belt 208. The lower mold half 204 is supported against a porous mesh support belt 300 as part of the corresponding belt 208. The lower mold half 204 of the belt mold 200 has a lower mold cavity 302 with an inner surface 304 thereof that is machined or etched or molded with a continuous pattern of the shingles 106 so as to form and shape the capstock layer 102 to the shape and surface topography of the shingles 106 while the capstock layer 102 is transported in and through the belt mold half 200. Advantageously, the continuous pattern of shingles 106 can vary from one shingle 106 to another without repeating the same shingle 106 along the entire length of the lower belt 208. A vacuum or suction of reduced air pressure compared to atmospheric pressure is drawn through the porous mesh support belt 300, which draws or urges the mold half 204 in support against the mesh support belt 300. The vacuum is drawn by operation of the one or more vacuum manifolds 224, FIG. 2. Further details of a support belt 300 and vacuum manifold 224 are disclosed in U.S. Pat. No. 5,906,840.

The mold half 204 has drilled passages 306 therethrough that extend from the mesh support belt 300 and into the mold cavity 302 to draw the capstock layer 102 by vacuum induced force against the lower mold half 204. The number and locations of the passages 306 are selected to distribute the vacuum induced force needed to vacuum mold the capstock layer 102 with the shingles 106 and the surface features 112. The diameters of the passages 306 are small to draw air but to be impermeable by the polymeric materials. Further, the passages 306 are small to minimize the mold flash that would appear as imperfections on the surfaces of the shingles 106. Further, the passages 306 are located to integrate the mold flash thereof with the surface topography features 112, such that the mold flash is hidden by the surface topography features 112.

FIG. 4 discloses the upper mold half 202 supported on a porous mesh support belt 400 of the corresponding upper belt 206. The upper mold half 202 of the belt mold 200 and the lower mold half 204 close together along the mold parting line 214 while moving from front to rear of the belt mold 200, together in synchronization with each other. Further, the capstock layer 102 is transported in synchronization with the mold halves 202, 204.

The upper mold half 202 defines an upper mold cavity 402 opening into the capstock layer 102 in the lower mold cavity 302. The upper mold half 202 has passages 404 formed by drilling through the mold half 202 to extend from the mesh support belt 400 to the mold cavity 402 through which passages 404 air is displaced from the upper mold cavity 402 by foam expansion of the foamed base layer 104, such that the air is displaced, and the foamed base layer 104 fills the entire mold cavity 402.

The polymeric material of the inner layer 104 is formed in the upper mold cavity 402 in situ with and against the capstock layer 102. An interior surface 406 on the upper mold cavity 402 forms and shapes the foaming polymeric material of the base layer 104 in situ against the continuous capstock layer 102 to comprise the building product 100. Further, a chemical bond or physical bond forms between the base layer 104 and the capstock layer 102 before leaving the mold apparatus 200.

Figure 5:
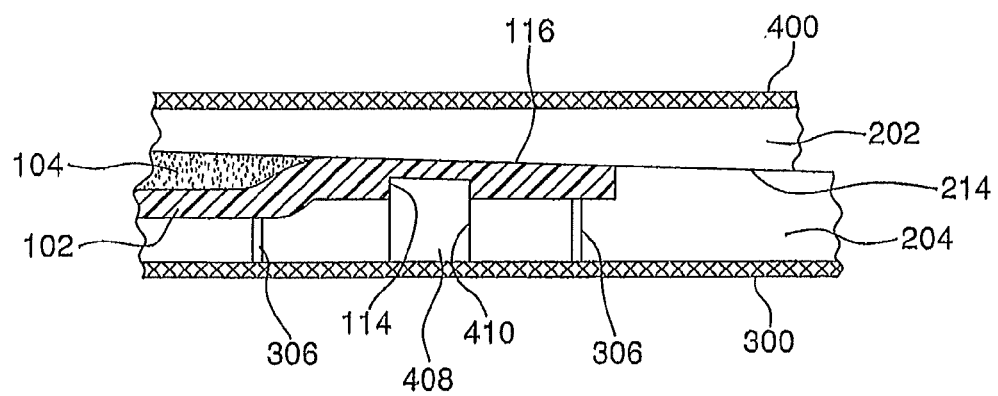
FIG. 5 is an enlarged section view of a portion of the apparatus in FIG. 4.

Each of FIGS. 4 and 5 discloses recessed surface features 114 that comprise the apertures or recesses 114 through the cross section of the capstock layer 102. Each of the apertures 114 is formed by a corresponding projection 408. Each projection 408 forms one of the apertures 114 by protruding into the lower mold cavity 302. During vacuum molding of the capstock layer 102, the projection 408 indents the capstock layer 102. For ease of manufacture, each projection 406 is manufactured as a dowel. The dowel is press fit and secured in an alignment bore 410 through the lower mold half 204. The shape of the dowel comprises various forms. The preferred shapes include, round, rounded or slotted shapes to produce apertures or recesses 114 particularly beneficial in fastening panels 100 to a roof surface.

With reference to FIG. 2, the upper mold half 202 and the lower mold half 204 travel over the front rollers 210, 210 to meet each other, then travel together from front to rear of the belt mold 200, and then rotate over the rear rollers 212, 212 and away from each other, which moves the mold halves 202, 204 apart to open the mold and release the continuous manufactured article comprising the roofing panel 100. The roofing panel 100, having the capstock layer 102 and the in situ foamed base layer 104, withdraws from the moving belt mold 200 in a rearward direction. The roofing panel 100 is transported to a cutting module 232 having a cutting tool 234 including, but not limited to, a circular saw, band saw, guillotine blade, hot knife or shears, that cuts the roofing panel 100 along the cut edge 102a to a desired length having a plurality of shingles 106.

Figure 6:
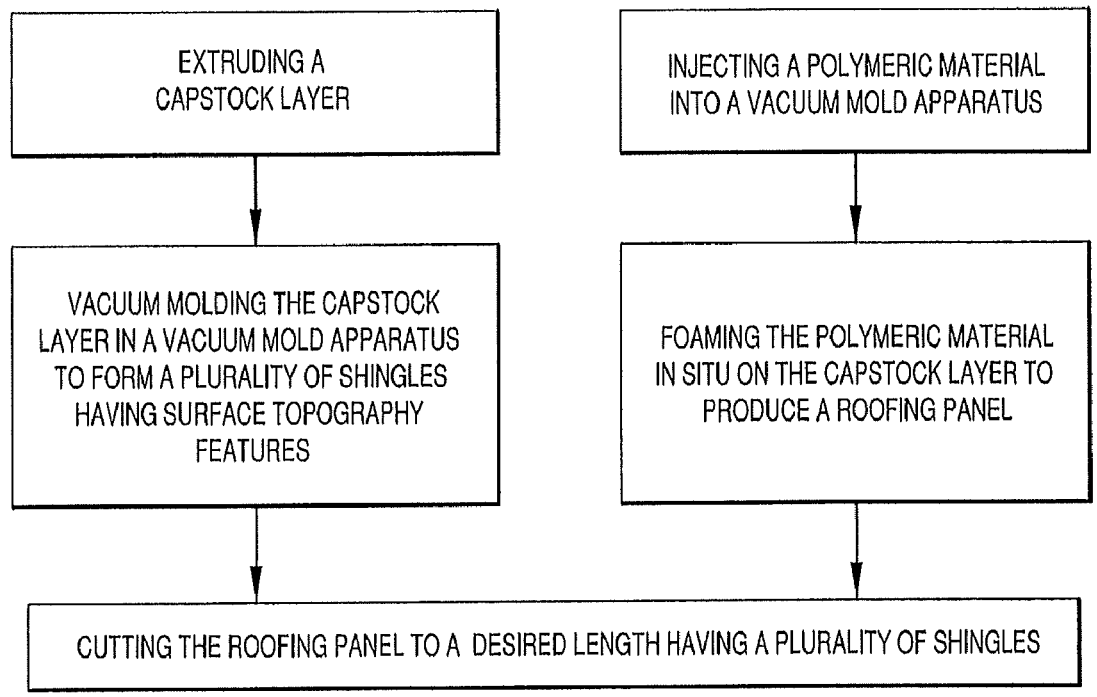
FIG. 6 is a flow diagram of a process by which a roofing panel is manufactured.

FIG. 6 discloses a process by which the panel 100 is manufactured by the apparatus 200. The process comprises, extruding a capstock layer 102 and vacuum molding the capstock layer 102 in the vacuum mold apparatus 200 to form the plurality of shingles 106 having butt edges 108, side edges 110, surface topography features 112 and the nailing edge 116 having the recesses 114. The process further comprises, injecting a polymeric material into the apparatus 200 and foaming the polymeric material in situ on the capstock layer 102 to produce the roofing panel 100. The process further comprises cutting the roofing panel 100 to a desired length having a plurality of shingles 106 and a cut edge 110a.

Figure 7:
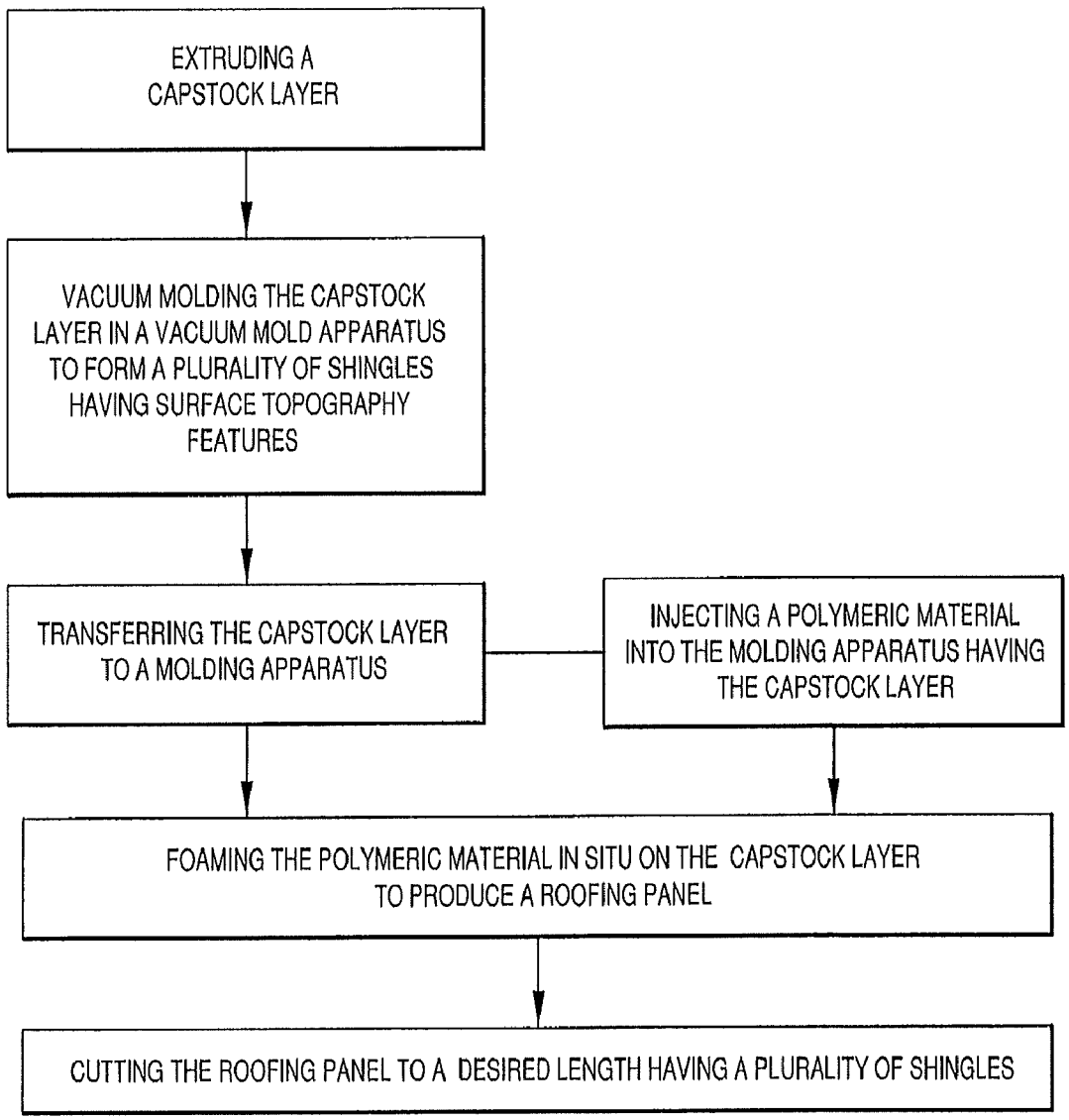
FIG. 7 is a flow diagram of another process by which a roofing panel is manufactured.
Figure 8:
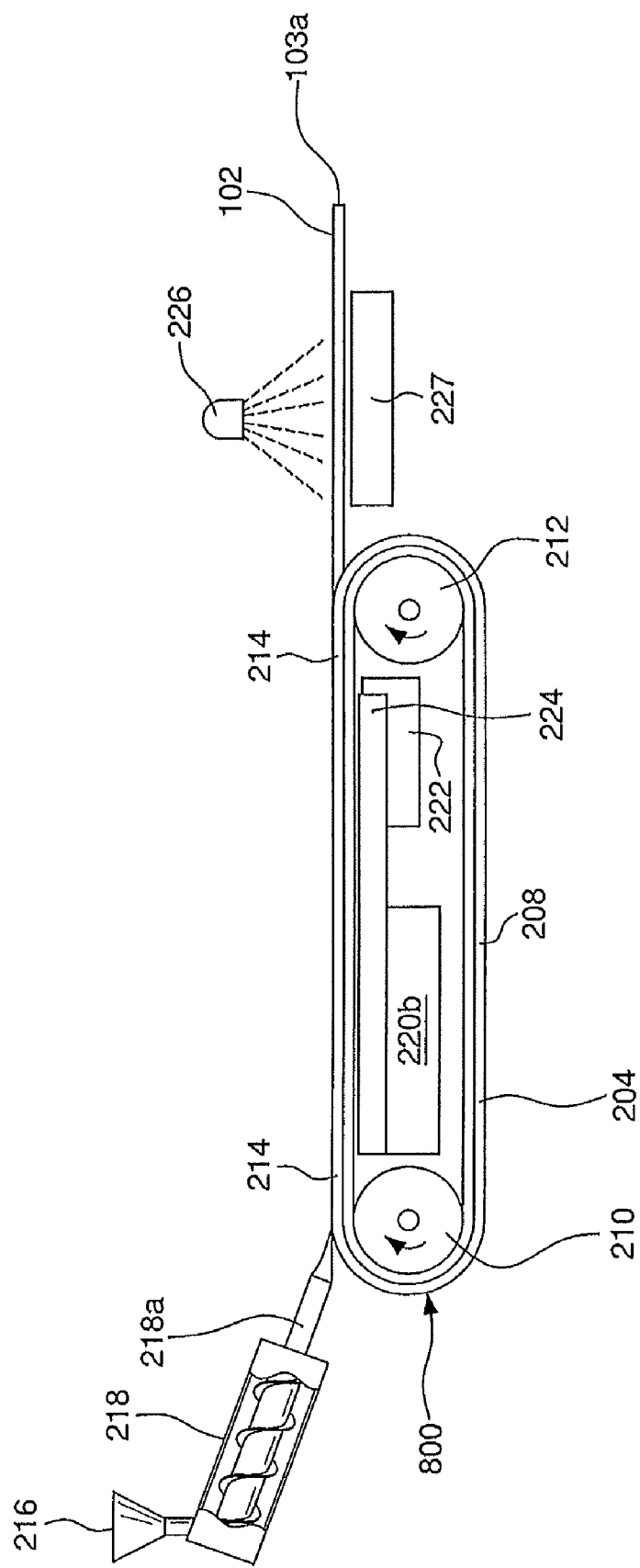
FIG. 8 is a portion of an apparatus performing the process disclosed by FIG. 7.

FIG. 7 discloses another process by which the panel 100 is manufactured by using the apparatus disclosed in FIG. 8 combined with the apparatus disclosed in FIG. 2. The apparatus 800 disclosed in FIG. 8 comprises a duplicate of the lower belt mold 204 as disclosed in FIGS. 2 and 3, which manufactures the capstock layer 102 in the apparatus 800 instead of being made in the apparatus 200 of FIG. 2. Thereby, the hopper 216 disclosed by FIG. 2 has been moved to the apparatus 800 of FIG. 8. Similarly, the feed screw 218 and the extrusion die 218a disclosed by FIG. 2 have been moved to the apparatus 800 to shape and form a continuous capstock layer 102. The capstock layer 102 is received by the belt mold 204, FIG. 8, which shapes and forms the capstock layer 102 by vacuum molding to produce the plurality of shingles 106, FIG. 1, having the butt edges 108 and the surface topography features 112, and the nailing edge 116 having the recesses 114. The capstock layer 102 emerges from the apparatus 800 at the rear of the belt mold 204, and is cooled by operation of the sprayer 226 and collector 227 which are duplicates of the same in the apparatus 200, FIG. 2. The capstock layer 102 is then cut to a desired length along the cut edge 103a. Thereby, a plurality of desired lengths of the capstock layer 102 are manufactured by the apparatus 800. When the length of each capstock layer 102 is equal to or less than the continuous length of the pattern of non-repeating shingles 106 on the lower belt 124, then the capstock layer 102 will have a pattern of non-repeating shingles 106.

The apparatus 800 precedes the apparatus 200 to provide a combination of the apparatus 800 and the apparatus 200. The lengths of the capstock layer 102 manufactured by the apparatus 800 are then fed end-on-end continuously into the apparatus 200, FIG. 2, which foams the base layer 104 in situ on the lengths of the capstock layer 102. Vacuum molding of the capstock layer 102 is no longer required to be performed by the apparatus 200, which has been performed by the apparatus 800, FIG. 8. Thereby, the apparatus 200 uses the lower moving belt 208 to transport the lengths of the capstock layer 102 without having to perform vacuum molding. The lower oven 220b of the apparatus 200 is no longer required to heat the capstock layer 102 to the extent that the capstock layer 102 attains its heat deflection temperature. Preferably the lower oven 220b heats the capstock layer 102 to the extent necessary to establish a chemical bond with the base layer 104. In another embodiment the capstock layer 102 is formed by a conventional extrusion process and a conventional non-continuous vacuum forming process, wherein formed sheets or panels are then introduced into apparatus 200, wherein the base layer 104 is formed in situ to form the roofing panel 100.

The process of FIG. 7 comprises, extruding a capstock layer 102 and vacuum molding the capstock layer 102 in the vacuum mold apparatus 800 to form the plurality of shingles 106 having the butt edges 108, side edges 110, surface topography features 112 and the nailing edge 116 having the recesses 114. The process further comprises transferring the capstock layer 102 to the molding apparatus 200, and injecting the polymeric material of the base layer 104 into the molding apparatus 200 having the capstock layer 102. The process further comprises foaming the polymeric material in situ on the capstock layer 102 in the apparatus 200 to produce the roofing panel 100. The process further comprises cutting the roofing panel 100 to desired length having a plurality of shingles 106 and a cut edge 110a.

The patents and patent applications referred to herein are expressly incorporated by reference herein. This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of manufacturing a panel of roofing shingles having a capstock layer of polymeric material and a base layer of polymeric foam material, comprising:

extruding the polymeric foam material separate from a precursor of the capstock layer by extruding a separate polymeric foam material;

extruding the precursor of the capstock layer separate from the polymeric foam material, by extruding a separate precursor with a nailing edge and an L-shaped cross section in which a short side of the L-shaped cross section forms the separate precursor having butt edges of the shingles, and a long side of the L-shaped cross section forms the separate precursor having multiple roofing shingles of different lengths and different heights to simulate randomly arranged shingles of different lengths and height, wherein each of the shingles is formed with substantially the same volume of the capstock layer to receive and fill with adequate polymeric material to avoid voids in the polymeric material caused by inadequate filling, followed by;

combining the separate precursor with the separate polymeric foam material within a belt mold;

transporting the precursor and the polymeric foam material within the belt mold, while one half of the belt mold forms and shapes the precursor to form the capstock layer with a shape and surface topography of multiple roofing shingles; and heating the polymeric foam material within the belt mold, while foaming and shaping the polymeric foam material within the belt mold in situ against the capstock layer, and while bonding together the polymeric foam material and the capstock layer within the belt mold to form the panel of roofing shingles.

2. The method of claim 1, further comprising:
cutting the precursor to a desired length prior to introducing the precursor into the belt mold.

3. The method of claim 1, further comprising:
cutting the panel of roofing shingles to a desired length.

4. The method of claim 1, further comprising:
forming an R-value thickness of the polymeric foam material within the belt mold.

5. The method of claim 1, wherein, said bonding together the capstock layer and foam polymer material includes forming a melt bond of the capstock layer and the foam polymeric layer at a melt temperature of the foam polymeric material below the melt temperature of the capstock layer.

6. The method of claim 1, wherein, said bonding together the capstock layer and the foam polymeric material includes melt bonding the capstock layer and the polymeric material while both are in the belt mold.

7. The method of claim 1, further comprising:
drawing the precursor against the belt mold by a vacuum.

8. The method of claim 1, further comprising:
indenting the previously extruded capstock layer with projections that extend into the belt mold to form fastener receiving recesses in the capstock layer.

* * * * *